UNITED STATES PATENT OFFICE.

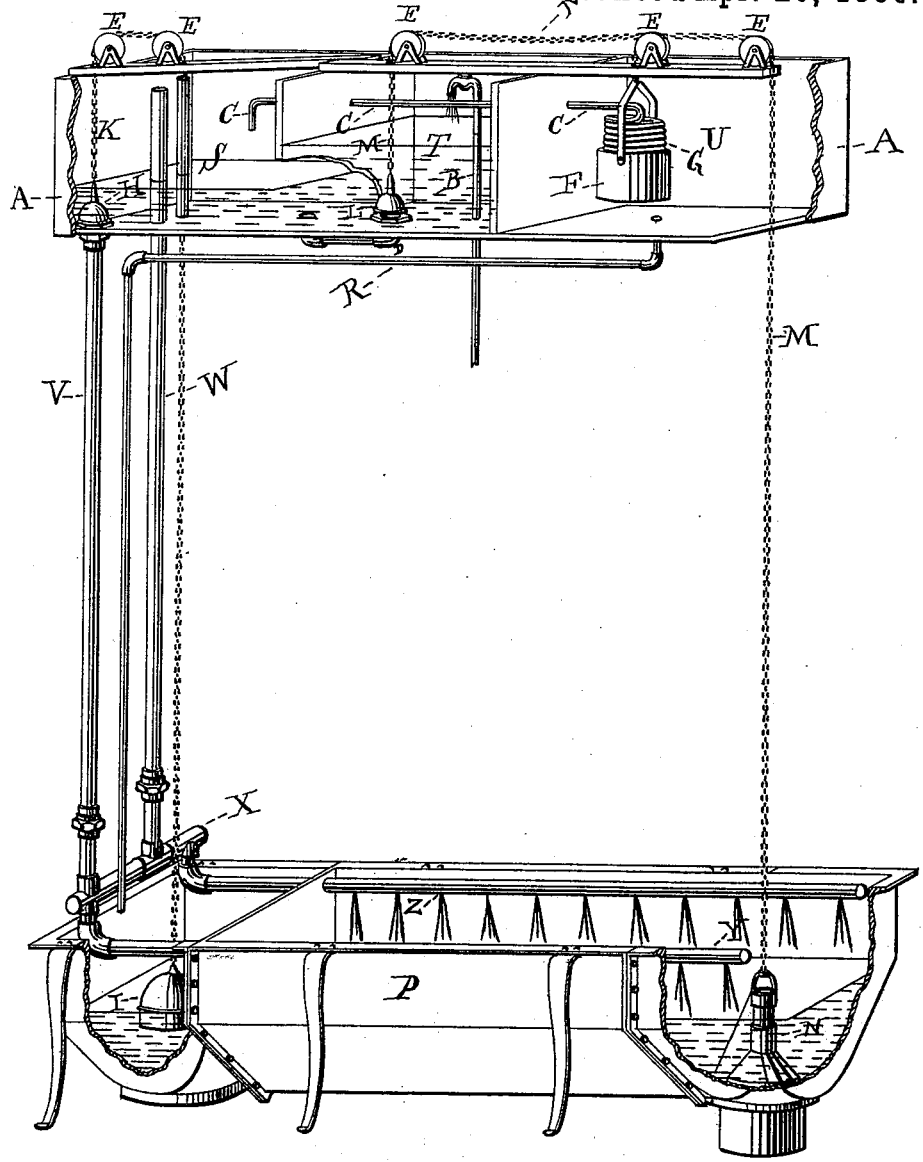

THOMAS HYDE, OF ALBANY, NEW YORK.

AUTOMATIC DISCHARGE FOR VESSELS HOLDING LIQUIDS.

SPECIFICATION forming part of Letters Patent No. 340,121, dated April 20, 1886.

Application filed January 12, 1884. Serial No. 117,229. (No model.)

*To all whom it may concern:*

Be it known that I, THOMAS HYDE, of the city and county of Albany, and State of New York, have invented a new and useful Improvement in an Automatic Discharge for Vessels Holding Liquids, of which invention the following is a specification.

My invention relates to that class of "discharges for vessels holding liquid" that is operated automatically by the liquid contained in the vessel, or by reason of the want of such liquid therein.

The objects of my invention are to regulate the flow of liquid from the vessel to which such discharge is applied, and to start or to stop such flow.

I attain my objects in the manner following, reference being had to the accompanying drawing, which forms a part hereof, and in which the figure shows a perspective side view of the vessel, (a part thereof being broken away,) and the means for automatically discharging the same, and also a basin into which the liquid is discharged.

In the drawing, A represents the vessel; S T U, the chambers of said vessel, respectively; B, the inlet-pipe through which the liquid enters one of the chambers of the said vessel A.

C is a conducting-pipe. D is a pipe or basin underneath said vessel A, and connected to two of the chambers thereof, through which the liquid flows from the one chamber to and into the other. E is a pulley, supported in any manner on top of the said vessel A.

F represents any vessel capable of holding liquids, but having one or more perforations in or near the bottom thereof, which is supported by a chain or cord. At one end of said siphon is a worm, G, which is inserted in the vessel F.

H is a valve, and I a float, connected together by a chain, K. L is another valve at the end of another chain, M, placed in the inlet-chamber of said vessel A. N is a valve at the other end of the chain M, placed in one of the compartments of the basin P, the latter being subdivided by a suitable partition into two compartments, 1 and 2, a small hole being made in said partition at or near the bottom thereof. R is a waste-pipe connected to one of the chambers of said vessel A, by means of which the waste liquid is conveyed to one of the said chambers of the said basin P. V is a pipe leading from the bottom of one of the end chambers of said vessel A to the horizontal pipe at the end of the basin P. W is another pipe, inserted in the same end chamber of said vessel and connected to said horizontal pipe; X, the horizontal pipe, above referred to, at the end of the basin P. Y and Z are pipes having perforations therein, connected to said pipe X and placed on the opposite inner upper surfaces of said basin P.

In carrying out my invention I employ a vessel, A, of any material which is capable of holding liquids and of any form. I then subdivide the vessel by suitable partitions into three chambers, S T U. Beneath the vessel I place either an auxiliary basin or pipe, D, which shall connect two of the said chambers, (as, for instance, S and T,) and by means of which the liquid can pass through the hole in the inlet-chamber T, through the hole in the auxiliary chamber S, up and into the latter chamber. In one of the said two chambers thus joined together by said auxiliary basin D of the vessel A, (S, for instance,) I place a pipe, V, leading from the bottom of the chamber to the horizontal pipe X, placed beneath the vessel A and at one end of the basin P. I sometimes place a second pipe, 3, in said chamber S, leading from the bottom thereof upward beyond the highest possible liquid-line of said vessel, through which the chain K passes. This, however, need not be done, because the chain may pass over the pulley, and then on the outside of the said vessel A. I then connect the said chamber S to the horizontal pipe X by an overflow-pipe, W, by passing the same either through the bottom of said chamber or through the side thereof at or near the highest liquid-line thereof. In the same chamber S, I also place one end of the conducting-pipe C, the remaining portion of the conducting-pipe extending through or above the partitions of said vessel A into the vessel F, placed in the chamber U.

When the vessel A is very short, and I desire to increase the length of the time for the liquid to pass from the one chamber through the conducting-pipe into the vessel F, I affix to the end of the conducting-pipe which enters the chamber U a worm, G, and place such worm in said vessel F. In the inlet-chamber T of said vessel A, I insert an inlet-pipe, B, with which to fill the said chamber with liquid. To the bottom of the chamber U, I attach a waste-pipe, R, and carry the same underneath the vessel A to one of the chambers of the basin P. Across the top of said vessel A, I place a rod or board, and either on, in, or underneath such rod or board I affix pulleys E, which are placed over the chamber S, over the chamber T, or the remaining chamber, U. These pulleys may be attached to the ceiling of the room over the vessel A. Any number of pulleys may be used.

Over the pulley placed over the chamber S, I pass a chain or cord, to one end of which I attach a valve, H, which is in said chamber, and at the other end a float, I, which is located in one of the chambers of the basin P. Over the pulleys I pass another chain or cord, M, to one end of which I attach a valve, L, in the inlet-chamber T, having such chain slackened between the points where the vessel F is hung thereto and the end where the valve L is attached, and at the other end of said chain or cord M, I attach the valve N, placed in the basin P. To said chain M, I hang the vessel F in the chamber U.

The mechanism is operated as follows: The opening in pipe V being closed by the falling of the valve H, when the chain attached thereto is manually lifted the liquid is let into the inlet-chamber T through the inlet-pipe B. The valve L being up, such liquid then passes through the hole in said chamber into the auxiliary basin or pipe D, then up through the hole in the bottom of the chamber S into said chamber. When the liquid in the chamber S has reached the conducting-pipe, a part of it passes through the conducting-pipe (and if a worm is used through the worm also) into the vessel F. The latter, being thus weighted with the liquid, drags the chain M down, and thereby raises the valve N, allowing the liquid in the basin P to pass therefrom, and closes the valve L, thereby preventing the liquid passing out of the inlet-chamber T. As the liquid leaves the vessel F through the perforations in the bottom thereof, the weight of the said vessel F and its contents lessen, and as said vessel F rises the valve L is raised and opens, allowing the water to escape from the inlet-chamber, and the valve N drops down and effectually closes the opening in the basin P, and the flow of the liquid from said basin is stopped. The contents of the vessel F, which has now passed into the chamber U, passes off by means of the waste-pipe R into the end chamber of the basin P. As the water rises in the last-mentioned chamber of basin P, it strikes the floating float I and raises the same, and thereby lowers the valve H, which, entering the hole in the bottom of the chamber S, prevents the liquid in that chamber passing out. As the volume of water in the said end chamber of the basin P decreases, the floating valve I falls, and by means of the chain drags the valve H up. When the valve H is raised, so that the liquid can pass off, or when there is too much liquid in the chamber S, so that it overflows into or by means of the pipe W, the liquid passes down into the horizontal pipe X, then into the two horizontal pipes Y and Z, which have perforations therein, and through such perforations therein into the basin P. The hole in the partition separating the two compartments of the basin P allows the liquid to pass from one chamber or compartment to the other. The chamber T, into which the liquid is first allowed to enter, need not be placed in the center of the vessel A or between the other chambers of said vessel, but may be placed next to any of the other chambers, it being only necessary that the chamber T be connected to the chamber which holds the open end of the conducting-pipe, so that the liquid can pass from chamber T to the other chamber.

Instead of using one vessel, as A, and dividing the same into three compartments, I sometimes use three vessels, each vessel representing one of the compartments of A, and being connected and operated in the manner above described.

Where the vessel A is subdivided into two compartments, or where two vessels representing said two compartments are only used, the auxiliary basin or pipe D is not used, but the conducting-pipe enters into the inlet-chamber and extends to the vessel F in the other chamber.

I do not confine myself to a chain or cord; but a combination of a chain or cord with a rod may be used.

Having thus described my invention, what I claim, and desire to secure by Letters Patent, is—

1. As a new article of manufacture, an automatic discharge for vessels holding liquids, consisting of a vessel to hold such liquid divided into three chambers by suitable partitions, two of which chambers shall be connected by means of a bent pipe, a conducting-pipe extending from the chamber which is connected to the inlet-chamber of said vessel by said bent pipe to a vessel having perforations in or near the bottom thereof in the third chamber of the vessel first above mentioned, which vessel having the perforations in or near its bottom is hung from a chain running over pulleys placed in a proper manner above or on top of said first above-mentioned vessel, upon one end of which chain is a valve to close a hole in the bottom of the inlet-chamber of said first above-mentioned vessel, and upon the other end of which chain is another valve to close the opening leading into any pipe outside of and separated from said vessel, subdivided as aforesaid, which it may be desired to close, for the purposes set forth.

2. As a new article of manufacture, an automatic discharge for vessels holding liquids, consisting of three vessels suitable for holding liquids, two of which shall be connected together by means of a pipe, a conducting-pipe extending from the vessel connected by said pipe to the other vessel into which the liquid first enters to a fourth vessel having a perforation in or near the bottom thereof situated in the third vessel, which fourth vessel having perforations in or near the bottom thereof is hung from a chain running over pulleys placed in a proper manner above or on the top of the vessel in which said fourth vessel is placed, upon one end of which chain is a valve to close the entrance to the pipe leading from the bottom of the inlet-chamber to the second chamber to which the inlet-chamber is connected, and upon the other end of which chain is another valve to close the opening leading into any pipe outside of and away from said three vessels which it is desired to close, for the purposes set forth.

3. As a new article of manufacture, an automatic discharge for vessels holding liquids, consisting of a vessel to hold such liquids divided into two chambers, (one of which shall be an inlet-chamber,) a conducting-pipe extending from the said inlet-chamber to a third vessel having perforations in or near the bottom thereof placed in the second chamber of said vessel, which third vessel having the perforations in or near its bottom is hung from a chain resting over pulleys placed in a proper manner above or on top of said vessel having the two chambers, upon one end of which chain is a valve to close a hole in the bottom of said inlet-chamber of said vessel, and upon the other end of which chain is another valve to close the opening leading into any pipe outside of and separated from said vessel, subdivided as aforesaid, which it may be desired to close, for the purpose set forth.

4. As a new article of manufacture, an automatic discharge for vessels holding liquids, consisting of two vessels suitable for holding liquids, (one of which shall be an inlet-vessel,) a conducting-pipe extending from said inlet-vessel to a third vessel having perforations in or near the bottom thereof placed in the second vessel, which third vessel having said perforations in or near its bottom is hung from a chain running over pulleys placed in a proper manner above or on top of said second vessel, upon one end of which chain is a valve to close a hole in the inlet-vessel, and upon the other end of which chain is another valve to close the opening leading into any pipe outside of and separated from said vessels which it may be desired to close, for the purpose set forth.

5. As a new article of manufacture, an automatic discharge for vessels holding liquids, consisting of a vessel to hold such liquids divided into three chambers by suitable partitions, one of which (the inlet-chamber) shall be connected to a second chamber by means of a pipe, a conducting-pipe extending from the chamber that is connected by said pipe to the inlet-chamber to a second vessel having perforations in or near the bottom thereof placed in the third chamber of said first vessel, which second vessel having the perforations in or near its bottom is hung from a chain running over pulleys placed in a proper manner above or on top of said third chambered vessel, upon one end of which chain is a valve to close the hole in the inlet-chamber leading into the pipe connecting said inlet-chamber to the second chamber, and upon the other end of which chain is another valve to close an opening leading into any pipe outside of and separated from said three-chambered vessel which it may be desired to close, and the valve in the chamber connected, as aforesaid, by said pipe to the inlet-chamber, connected by a chain running over a pulley placed above or on top of said three-chambered vessel to a floating valve in an outside vessel, for the purposes set forth.

6. As a new article of manufacture, an automatic discharge for vessels holding liquids, consisting of three vessels suitable for holding liquids, one of which (the inlet-vessel) shall be connected by means of a pipe to a second, a conducting-pipe leading from said second vessel to a fourth vessel having perforations in or near the bottom thereof placed in the third vessel, which fourth vessel having said perforations is hung from a chain running over pulleys placed in a proper manner above or on the top of said inlet and third vessels, upon one end of which chain is a valve in the inlet-vessel to close the hole leading into the pipe connecting said inlet with said second vessels, and upon the other end of which chain is another valve to close the opening leading into any pipe outside of and separated from said three vessels, and a valve in said second vessel connected, as aforesaid, to said inlet-vessel, connected by a chain running over a pulley placed above or on top of said second vessel to a floating valve in a fifth vessel, for the purposes set forth.

7. In an automatic discharge for vessels holding liquids, the combination of a vessel, A, to hold such liquid, divided into three chambers, S T U, by suitable partitions, one of which chambers, being an inlet-chamber, shall be connected by a pipe, D, to a second chamber $a$, conducting-pipe, C, extending from the said second chamber connected, as aforesaid, to said inlet-vessel, to a vessel, F, having perforations in or near the bottom thereof, placed in the third chamber of said vessel A, which vessel F is hung from a chain, M, running over pulleys E E, placed in a proper manner above or on top of said vessel A, upon one end of which chain M is a valve, L, placed in said inlet-chamber to close the hole leading from said inlet-chamber to said connecting-pipe D, and upon the other end of which chain M is another valve, N, to close the entrance to a pipe leading from a basin, P, also a valve, H, placed in said second chamber to close the entrance to a pipe, U, leading from said second chamber, which valve H is connected to another float, I, by a chain running over pulleys E E, placed above or on top of said second chamber of the vessel A, an overflow-pipe, W, in said second chamber of said vessel A, an inlet-pipe, B, entering into said inlet-chamber, and a waste-pipe, R, leading from said third chamber of said vessel A to a basin, P, also the horizontal pipe X, connected to the pipe V and overflow-pipe W, and also to the horizontal perforated pipes Y and Z, and the basin P, for the purposes set forth.

THOMAS HYDE.

Witnesses:
EDWARD W. RANKIN,
JULIUS F. HARRIS.